US012631509B2

(12) United States Patent
Schneider

(10) Patent No.: US 12,631,509 B2
(45) Date of Patent: May 19, 2026

(54) PIEZOELECTRIC MEASURING DEVICE AND METHOD OF OPERATING THE MEASURING DEVICE

(71) Applicant: Kistler Holding AG, Winterthur (CH)

(72) Inventor: Jochen Schneider, Schorndorf (DE)

(73) Assignee: Kistler Holding AG, Winterthur (CH)

( * ) Notice: Subject to any disclaimer, the term of this patent is extended or adjusted under 35 U.S.C. 154(b) by 273 days.

(21) Appl. No.: 18/484,525

(22) Filed: Oct. 11, 2023

(65) Prior Publication Data

US 2024/0133758 A1 Apr. 25, 2024
US 2024/0230442 A9 Jul. 11, 2024

(30) Foreign Application Priority Data

Oct. 19, 2022 (EP) ..................................... 22202535

(51) Int. Cl.
*G01L 9/08* (2006.01)
(52) U.S. Cl.
CPC ...................................... *G01L 9/08* (2013.01)
(58) Field of Classification Search
None
See application file for complete search history.

(56) References Cited

U.S. PATENT DOCUMENTS 4,009,447 A 2/1977 Wolf et al.
4,714,890 A 12/1987 Dechene et al.
6,218,898 B1 * 4/2001 Zanetti ................. G01D 18/004
310/311
9,410,988 B2 8/2016 Zavis
(Continued)

FOREIGN PATENT DOCUMENTS

CH 542 434 A 9/1973
CH 693 074 A5 2/2003
JP S5782772 A 5/1982
(Continued)

OTHER PUBLICATIONS

Kuratle Rolf H. et al., "The Basic of Piezoelectric Measurement Technology", Jan. 1, 2012 (Jan. 1, 2012), Seiten 1-6, URL:http;// centaur-wp.s3.amazonaws.com/theengineer/prod/content/uploads/ 2012/10/25153200/20.188e-07.99.pdf [gefunden am Mar. 15, 2023].
(Continued)

*Primary Examiner* — Eric S. McCall
*Assistant Examiner* — Nigel H Plumb
(74) *Attorney, Agent, or Firm* — Dority & Manning, P.A.

(57) ABSTRACT

A piezoelectric measuring device includes a sensor element that generates a measurement signal for a pressure and a data acquisition device to evaluate the measurement signal. The sensor element includes an operational amplifier with an inverting input and an output, a feedback capacitance in parallel with the inverting input and the output, and a reset switching element in parallel with the inverting input and the output. The operational amplifier provides an electrical supply voltage and the data acquisition device includes a measurement cycle circuit configured to activate the electrical supply voltage before a measurement cycle and deactivate after the measurement cycle. The sensor element includes a power-on reset logic to detect the electrical supply voltage accordingly close or reopen the reset switching element.

14 Claims, 5 Drawing Sheets

(56)  References Cited

U.S. PATENT DOCUMENTS 11,093,088 B2 *   8/2021   Bagheri   ................ G06F 3/0445

FOREIGN PATENT DOCUMENTS

| | | |
|---|---|---|
| JP | S61280519 A | 12/1986 |
| JP | S62500469 A | 2/1987 |
| JP | H01205581 A | 8/1989 |
| JP | 2018-72024 A | 5/2018 |
| WO | WO 2014/120430 A1 | 8/2014 |
| WO | WO 2016/059940 | 4/2016 |

OTHER PUBLICATIONS

EPO Search Report with Translation, Mar. 28, 2023, 12 pages.
JP Office Action with Translation, Dec. 3, 2024.
JP Office Action with Translation, Apr. 9, 2025.

* cited by examiner

PIEZOELECTRIC MEASURING DEVICE AND METHOD OF OPERATING THE MEASURING DEVICE

FIELD OF THE INVENTION

The invention relates to a piezoelectric measuring device for measuring a pressure, as it is used in particular in the field of injection molds for measuring the cavity pressure. In particular, the measuring device according to the invention is characterized by a reliable or safe measurement of the cavity pressure, respectively. Furthermore, the invention relates to a method of operating a measuring device which is designed in particular in the manner according to the invention.

BACKGROUND OF THE INVENTION

A piezoelectric measuring device comprising the features of the preamble of claim 1 is known from CH542434A5, which corresponds to commonly owned U.S. Pat. No. 4,009, 447, which is hereby incorporated in its entirety herein for all purposes. The piezoelectric measuring device comprises a sensor element. The sensor element comprises a piezo element, an operational amplifier, a feedback capacitance, an electrical discharge resistor and a reset switch. The cavity pressure to be measured acts as a force on the piezo element. Under the effect of the force, the piezo element generates electrical charges. The electrical charges are transduced into an electrical voltage signal by means of said operational amplifier. The feedback capacitance is arranged in parallel with the inverting input of the operational amplifier and the output of the operational amplifier and serves as an integrator. The electrical discharge resistor and the reset switch are also arranged in parallel with the inverting input of the operational amplifier and the output of the operational amplifier. The electrical discharge resistor continuously discharges the feedback capacitance so that it is not overloaded after some time by fault currents in the sensor element, which fault currents occur in particular in quasi-static measurements due to the only finitely high electrical insulation resistances in the sensor element. And by closing the residual switch, the feedback capacitance is discharged before the start of the measurement in order to cause zeroing of the sensor element. During the measurement, the residual switch is open.

Furthermore, it is known from WO2014/120430A1, which corresponds to U.S. Pat. No. 9,410,988, which is hereby incorporated in its entirety herein for all purposes, in a piezoelectric measuring device disclosed in association with FIG. 2 to provide a data acquisition device with a switch. Said switch is used to switch between different sources of electrical supply voltages.

SUMMARY OF THE INVENTION

The piezoelectric measuring device according to the invention comprises a sensor element, which sensor element is designed to generate a measurement signal for a pressure to be measured. The piezoelectric measuring device comprises a cable for transmitting the measurement signal to a data acquisition device, which data acquisition device is designed to acquire and evaluate the transmitted measurement signal. The sensor element comprises an operational amplifier, which operational amplifier comprises an inverting input and an output. The sensor element comprises a feedback capacitance, which feedback capacitance is arranged in parallel with the inverting input and the output of the operational amplifier. Also, the sensor element comprises a reset switching element arranged in parallel with the inverting input and the output of the operational amplifier. And the data acquisition device is additionally designed to provide an electrical supply voltage for the sensor element.

One embodiment of the piezoelectric measuring device according to the invention 1 is based on the idea of constructing the sensor element known from the prior art with an operational amplifier and a feedback capacitance without an electrical discharge resistor.

Despite omitting an electrical discharge resistor for discharging the feedback capacitance, the invention nevertheless provides reliable discharge of the feedback capacitance with relatively little circuitry, enabling quasi-static measurements. In the light of these explanations, an embodiment of the piezoelectric measuring device according to the invention therefore is designed in a manner that a data acquisition device of the measuring device additionally comprises a measuring cycle circuit which is designed to switch on the electrical supply voltage for the sensor element prior to the start of a measuring cycle and to switch it off after completion of the measuring cycle. Thus, according to the invention, the sensor element has a power-on-reset circuit, which power-on-reset logic is designed to detect the presence of the electrical supply voltage and to close and reopen the reset switching element when the electrical supply voltage is present before the start of a measuring cycle. Thus, the feedback capacitance is at least indirectly discharged prior to the start of a measuring cycle There are other advantageous developments of the piezoelectric measuring device according to the invention.

In particular, the measuring cycle circuit includes a power supply switching element for turning on or off a power supply source for the sensor element.

Preferably, the discharging of the feedback capacitance by means of the power-on reset circuit is performed by the power-on reset circuit being designed to actuate the reset switching element for discharging the feedback capacitance.

Furthermore, it is preferred if the data acquisition device comprises a tare circuit which is designed to tare a first measurement signal transmitted from the sensor element. In particular, this increases the measurement accuracy during the subsequent phase of the measurement.

A preferred development of the reset circuit is designed in a manner that it comprises a power-on reset logic which closes the reset switching element for discharging the feedback capacitance after a predetermined voltage value has been exceeded for a defined time and then reopens it again.

The invention also enables signal transmission and electrical power supply to the sensor element via a conductor element, which conductor element is a single-core cable with a single signal conductor. Thus, no further conductors are required to trigger a reset at the feedback capacitance, which is particularly advantageous in an injection mold where limited space is prevailing.

Also, in an alternative circuit, it may be provided that the sensor element 10 comprises a 4 . . . 20 mA transmitter and a current interface. The 4 . . . 20 mA transmitter is connected to the output of the operational amplifier and is designed to transduce the measurement signal provided by the operational amplifier as a voltage signal into a current signal. The 4 . . . 20 mA transmitter is connected to the current interface. Said current interface is connected to the conductor element. The current signal is transmitted from the 4 . . . 20 mA transmitter via the current interface and the conductor element to the data acquisition device. Furthermore, the data acquisition device comprises a shunt element connected downstream of the voltage supply source and an additional operational amplifier. The shunt element and the additional operational amplifier are designed to transduce the transmitted current signal back into a voltage signal. Thus, the measurement signal is transmitted in a current-adapted manner from the sensor element to the data acquisition device. This is particularly advantageous in the harsh environment with high interference levels that occurs during the operation of an injection mold, since such current-adapted transmission is highly reliable.

The sensor element may comprise a TEDS in which TEDS digital data concerning the sensor element and/or the measuring point is stored. The data acquisition device then comprises a read and write circuit, which read and write circuit is designed to read digital data from the TEDS and/or write digital data into the TEDS. This enables an automatic provision of digital data via the sensor element to the data acquisition device without such digital data having to be entered into the data acquisition device by a person via special input means. Such digital data concerning the sensor element includes sensor type, sensitivity, calibration data, etc. Also, by providing the digital data in an automatic manner, input errors in the input of the digital data are avoided, which increases the quality and availability of the piezoelectric measuring device.

The sensor element comprises a piezo element, which piezo element generates electric charges under the effect of the pressure to be measured, which electric charges flow into the inverting input of the operational amplifier. With regard to a particularly compact design of the measuring device, it is also advantageous if the operational amplifier and the feedback capacitance are arranged together with the piezo element in a common housing of the sensor element.

The piezoelectric measuring device is preferably used to measure the cavity pressure prevailing in an injection mold during operation and is designed accordingly for this purpose. In particular, this comprises a design of the piezoelectric measuring device or of the sensor element so that it can permanently withstand the operating temperatures and relatively high pressures frequently prevailing above 100° C. without damage.

Furthermore, the invention relates to a method for operating a piezoelectric measuring device, which is in particular designed in the manner explained above. Here, a measurement signal is generated by means of a sensor element for a pressure to be measured, which measurement signal is transmitted by means of a conductor element to a data acquisition device, which data acquisition device acquires and evaluates the transmitted measurement signal. The sensor element comprises an operational amplifier with an inverting input and an output. The sensor element comprises a feedback capacitance, which feedback capacitance is arranged in parallel with the inverting input and the output of the operational amplifier. And the sensor element comprises a reset switching element, which reset switching element is arranged in parallel with the inverting input and the output of the operational amplifier. In addition, the data acquisition device provides an electrical supply voltage for the sensor element. The method according to the invention is characterized in that the data acquisition device has a measuring cycle circuit, which measuring cycle circuit switches on the electrical supply voltage for the sensor element in a first step prior to the start of a measuring cycle; in that the sensor element has a power-on reset logic, which power-on reset logic detects the presence of the electrical supply voltage in a second step and closes and reopens the reset switching element if the electrical supply voltage is present prior to the start of a measuring cycle; and in that the measuring cycle circuit switches off the electrical supply voltage for the sensor element in a fifth step after completion of the measuring cycle.

A preferred development of the method according to the invention is that it is used to measure a cavity pressure prevailing in an injection mold during operation. In the first step, a measuring cycle for measuring the cavity pressure is started in that the electrical supply voltage for the sensor element is provided by the measuring cycle circuit. Now, in the second step, the presence of the electrical supply voltage is detected by means of a reset logic in the power-on-reset circuit, whereupon the power-on-reset circuit closes the reset switching element for a predetermined period of time, by means of which closed reset switching element the feedback capacitance is discharged. Subsequently, the power-on reset circuit again opens the reset switching element. In a third step, the measuring cycle for measuring the cavity pressure is carried out for a certain period of time, during which electrical charges generated by the piezo element are transduced into the measurement signal by means of the operational amplifier, which measurement signal is acquired and evaluated by means of the data acquisition device. Upon completion of the measuring cycle, the measuring cycle circuit turns off the electrical supply voltage for the sensor element in the fifth step.

Preferably, the data acquisition device has a tare circuit, which tare circuit tares a first measurement signal acquired by the data acquisition device in a fourth step to increase the measurement accuracy.

Further preferably, the sensor element comprises a TEDS, a first diode and a second diode, in which TEDS digital data concerning the sensor element and/or the measuring point are stored. In this case the data acquisition device comprises a read and write circuit and a read and write switching element. To start a read-write operation, in a zeroth step the read and write switching element is activated by the read and write circuit. A negative DC voltage is provided by the read and write circuit, which negative DC voltage is applied to the conductor element and renders the first diode non-conductive and the second diode conductive. The read and write circuit is designed to read digital data from the TEDS and/or write digital data into the TEDS. In order to terminate the read-write operation, the read and write switching element is deactivated by the read and write circuit.

Further advantages, features and details of the invention will be apparent from the following description of preferred embodiments of the invention and from the drawings.

BRIEF DESCRIPTION OF THE DRAWINGS

Further advantages, features and details of the invention will be apparent from the following description of exemplary embodiments and the drawings in which.

In the figures, identical elements or elements, respectively, having the same function are provided with the same reference numerals.

DETAILED DESCRIPTION OF EXEMPLARY EMBODIMENTS OF THE INVENTION

Figure 1:
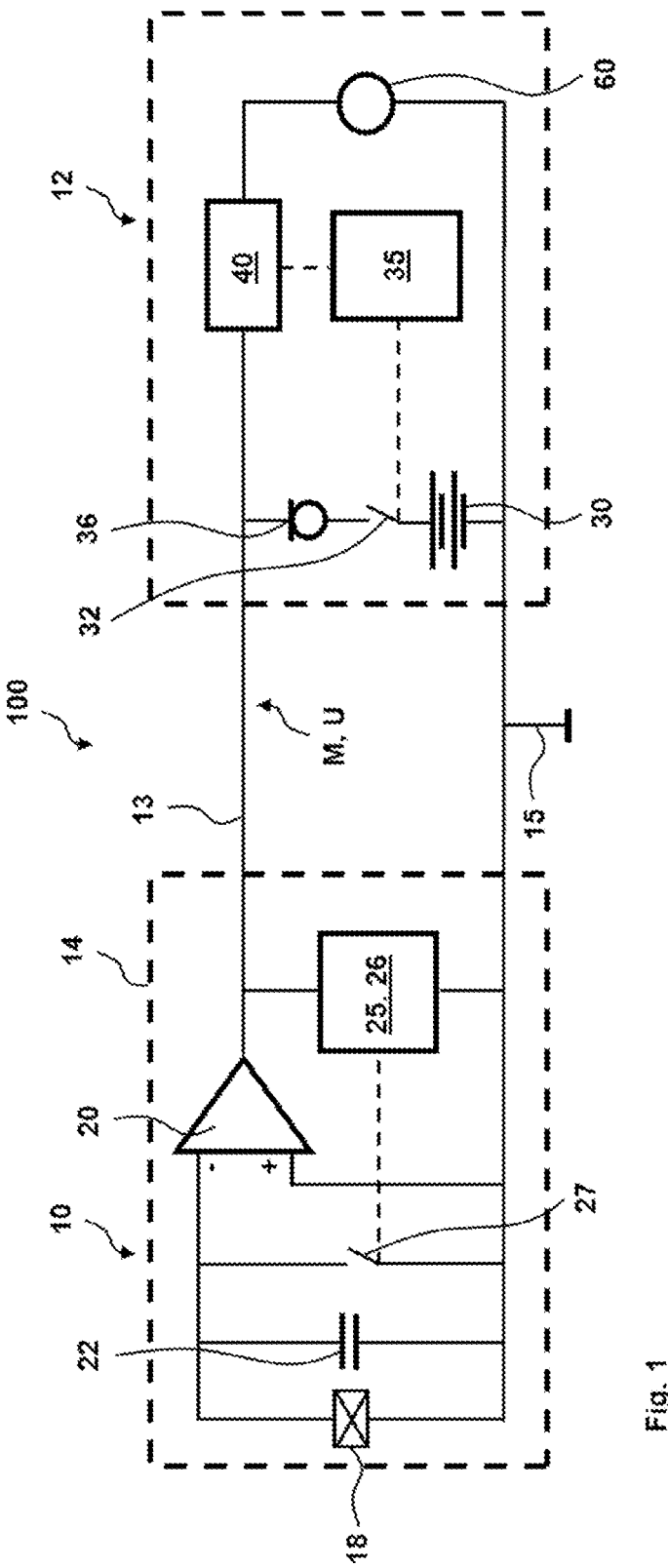
FIG. 1 shows a first embodiment of a piezoelectric measuring device 100 for measuring a cavity pressure prevailing in an injection mold.

FIG. 1 represents a first embodiment of a piezoelectric measuring device 100, which is preferably used for measuring a cavity pressure prevailing in an injection mold, which is not shown, during operation. The injection mold can be used for injection molding of molded parts made of a liquefiable material such as plastic, metal, etc.

In addition, it is explained that the piezoelectric measuring device 100 can also be used in principle for other applications, for example for force monitoring in assembly processes, if e.g. cycle times during which signals are to be evaluated are sufficiently short in such assembly processes.

The piezoelectric measuring device 100 comprises a sensor element 10 which is arranged in a housing 14. The function of said sensor element 10 is to generate a measurement signal M for the cavity pressure to be measured.

The piezoelectric measuring device 100 comprises a data acquisition device 12, which is arranged in a separate location from the sensor element 10. The function of said data acquisition device 12 is to acquire the measurement signal M from the sensor element 10 and to evaluate the measurement signal M in order to draw conclusions about the cavity pressure from the evaluation of the measurement signal M.

The sensor element 10 is electrically connected to the data acquisition device 12. The electrical connection is established by means of a conductor element 13. Preferably, conductor element 13 is a single-core cable with a single signal conductor. Said conductor element 13 serves to transmit the measurement signal M from the sensor element 10 to the data acquisition device 12 and to provide an electrical supply voltage U for the sensor element 10 through the data acquisition device 12. Housing 14 of the sensor element 10 and the data acquisition device 12 have the same electrical mass 15. Preferably, said housing 14 of the sensor element 10 and the data acquisition device 12 reside on the same electrical mass 15 via the injection mold. Said electrical mass 15 forms the electrical reference potential for the transmission of the measurement signal M and the provision of the electrical supply voltage U. Conductor element 13 can also be a two-core cable comprising a signal conductor and a mass conductor connected to the electrical mass 15. Said signal conductor and mass conductor are made of electrically conductive material such as copper, etc.

The sensor element 10 comprises a piezo element 18 that is configured and disposed so that the cavity pressure to be measured acts as a force on the piezo element 18, which piezo element 18 and under the action of the force generates piezoelectric charges. In addition to the piezo element 18, said sensor element 10 also includes an operational amplifier 20 having an inverting input and an output. The electrical charges generated by the piezo element 18 flow into the inverting input of the operational amplifier 20, which is labelled with a minus sign in FIGS. 1 to 4. In FIGS. 1 to 4, the non-inverting input of the operational amplifier 20 is labelled with a plus sign. Furthermore, a feedback capacitance 22 serving as an integrator is provided, which is arranged electrically in parallel to the inverting input and the output of the operational amplifier 20. The operational amplifier 20 and the feedback capacitance 22 form a charge amplifier which transduces the electrical charges into the measurement signal M. The measurement signal M can be tapped at the output of the operational amplifier 20. The measurement signal M is a voltage signal and typically has an amplitude of a few volts, for example 0V to +10V, and a dynamics of a few kHz.

Additionally, said sensor element 10 includes a power-on reset circuit 25 that includes a reset logic 26. The power-on reset circuit 25 acts on a reset switching element 27 arranged in parallel with the feedback capacitance 22. The reset switching element 27 is configured and electrically disposed so that it serves to discharge the feedback capacitance 22 in an electrically closed position. In FIG. 1, the reset switching element 27 is shown schematically in the electrically open position, which maintains the charge storage in the feedback capacitance 22.

In the first embodiment of the piezoelectric measuring device 100 according to FIG. 1, the measurement signal M is transmitted as a voltage signal voltage-adapted from the sensor element 10 to the data acquisition device 12. Furthermore, the data acquisition device 12 is designed to provide the electrical supply voltage U for the sensor element 10 via the conductor element 13. For this purpose, the data acquisition device 12 has a voltage supply source 30 with a positive DC voltage of typically between +18V to +30V, which is electrically coupled to the conductor element 13 via a constant current regulating diode 36, wherein the electrical supply voltage U can be switched via a voltage supply switching element 32. The activation or actuation (opening and closing) of the voltage supply switching element 32 takes place and is controlled by means of a measuring cycle circuit 35.

Figure 5:
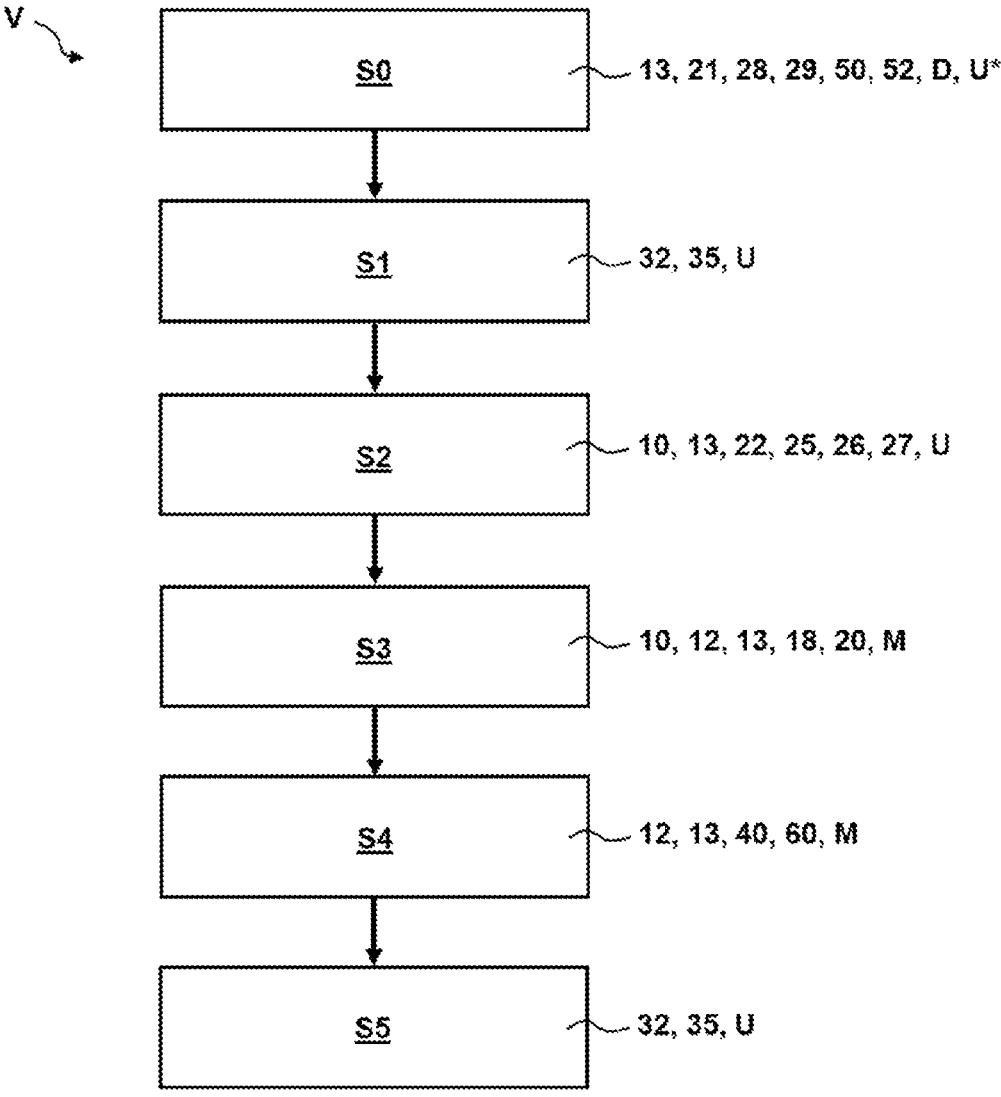
FIG. 5 shows a flowchart comprising steps S0 to S5 of the method V for operating the piezoelectric measuring device 100 according to any of the FIGS. 1 to 4.

The operation of the piezoelectric measuring device 100 for detecting the cavity pressure of the injection mold will now be described in detail with reference to the flowchart of FIG. 5.

A measuring cycle for measuring the cavity pressure is started by first providing the electrical supply voltage U for the sensor element 10 in a first step S1 by appropriately activating the measuring cycle circuit 35 and closing the voltage supply element 32. The measuring cycle circuit 35 and the voltage supply element 32 are in operative connection with each other, which is shown by a dashed line in FIGS. 1 to 4.

The electrical supply voltage U is provided to the sensor element 10 via the conductor element 13. In a second step S2, the switch-on or presence of the electrical supply voltage U in the sensor element 10 is now detected by means of the reset logic 26. This causes the power-on reset circuit 25 to close the reset switching element 27 during a predetermined period of time in order to discharge the feedback capacitance 22. Also for this purpose, the power-on reset circuit 25 and the reset switching element 27 are in operative connection with each other, which is shown by a dotted line in FIGS. 1 to 4. Subsequently, the reset switching element 27 is opened again by means of the power-on reset circuit 25.

Now, in a third step S3, the actual measuring cycle is performed during a predetermined period of time, in which the electric charges generated by the piezo element 18 are transduced into the measurement signal M by means of the operational amplifier 20, which measurement signal M is transmitted from the sensor element 10 via the conductor element 13 to the data acquisition device 12 and is acquired and evaluated by the data acquisition device 12.

The data acquisition device 12 optionally comprises a tare circuit 40. The tare circuit 40 comprises a signal input, a command input, and a signal output. Via the signal input, the tare circuit 40 is connected to the conductor element 13. Via the command input shown as a dashed line in FIGS. 1 to 4, the tare circuit 40 can be activated by the measuring cycle circuit 35. In an optional fourth step S4, the tare circuit 40 receives the measurement signal M via its signal input. A first measurement signal M acquired by the data acquisition device 12 in the measuring cycle is thus received and tared by the tare circuit 40. The tare circuit 40 outputs the tared measurement signal as an electrical voltage signal 60 via the signal output. During taring, a level of the first measurement signal M is set to 0V.

Subsequently, the electrical voltage signals 60 are evaluated during operation of the injection molding machine, in particular during a measuring cycle typically lasting up to a maximum of one minute.

To terminate the measuring cycle, in a fifth step S5 the electrical supply voltage U is switched off again via the measuring cycle circuit 35 and the voltage supply switching element 32.

Figure 2:
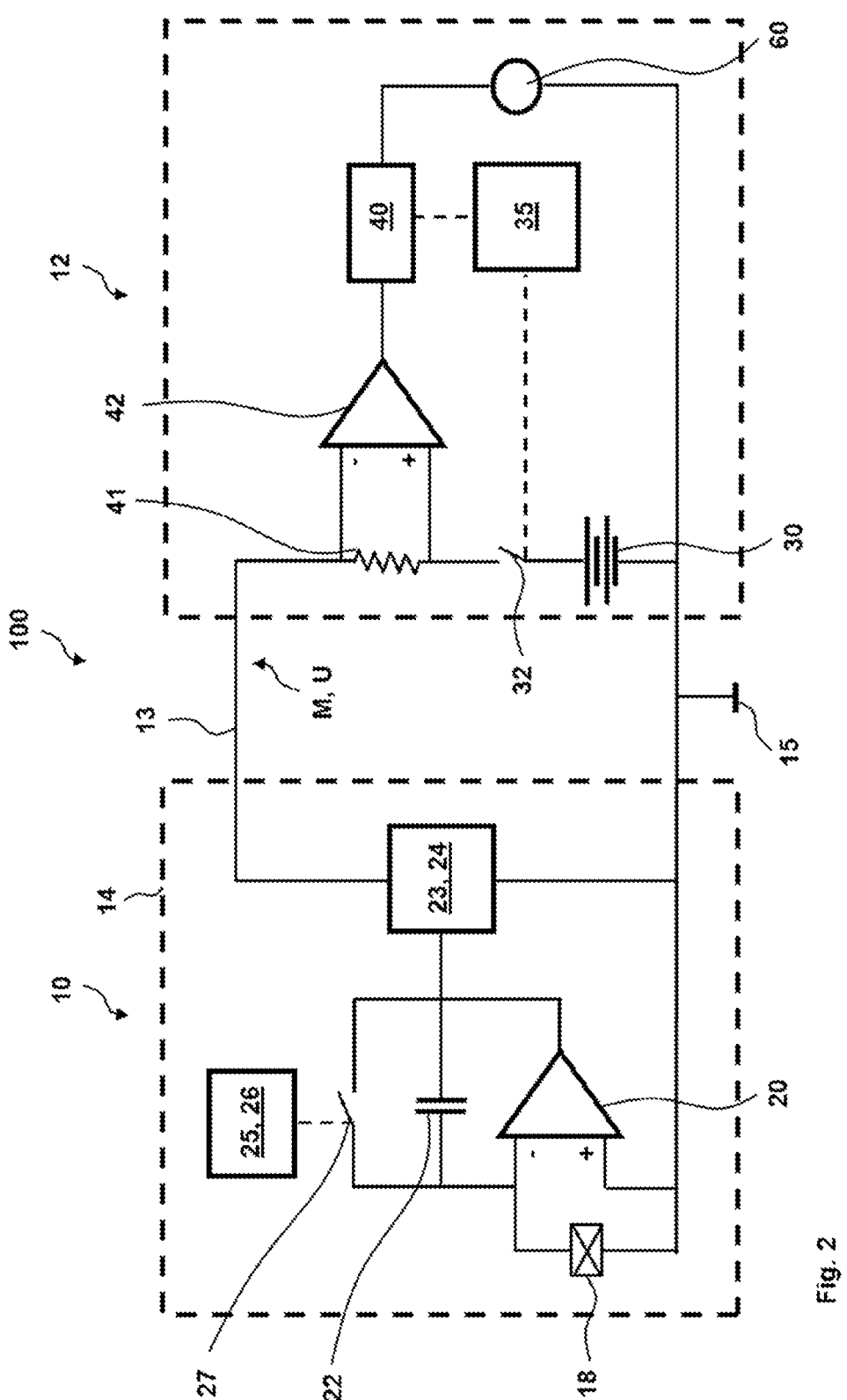
FIG. 2 shows a second embodiment of a piezoelectric measuring device 100 for measuring a cavity pressure prevailing in an injection mold.

The second embodiment of a piezoelectric measuring device 100 schematically shown in FIG. 2 is largely based on the first embodiment of the piezoelectric measuring device 100 according to FIG. 1, so that reference is made to its description in order to avoid repetition. In the following explanation, only differences of the second embodiment of the piezoelectric measuring device 100 according to FIG. 2 compared to the first embodiment of the piezoelectric measuring device 100 schematically depicted according to FIG. 1 are explained.

Thus, in the second embodiment of the piezoelectric measuring device 100 according to FIG. 2, the measurement signal M is transmitted as a current signal from the sensor element 10 to the data acquisition device 12 in a current-matched manner. For this purpose, said sensor element 10 comprises a 4 . . . 20 mA transmitter 23 and a current interface 24. Said 4 . . . 20 mA transmitter 23 is electrically connected to the output of the operational amplifier 20. The 4 . . . 20 mA transmitter 23 is designed to transduce the voltage signal provided by the operational amplifier 20 into a current signal. The voltage signal is transduced into a current signal in proportion to its magnitude. For example, a voltage signal of 0V is transduced into a current signal of 4 mA and a voltage signal of 10V is transduced into a current signal of 20 mA. The 4 . . . 20 mA transmitter 23 is electrically connected to the current interface 24. And the current interface 24 is electrically connected to the conductor element 13. The current signal can be transmitted to the data acquisition device 12 via the current interface 24 and the conductor element 13.

The data acquisition device 12 comprises a shunt element 41 connected electrically downstream of the voltage supply source 30 and a further operational amplifier 42. Said shunt element 41 and the further operational amplifier 42 are designed to transduce a transmitted current signal back into a voltage signal. The current signal flows into the inverting input of the further operational amplifier 42, which is figuratively labelled with a minus sign. The non-inverting input of the further operational amplifier 42 is figuratively labelled with a plus sign. The voltage signal can be tapped at the output of the further operational amplifier 42. Also during reconversion, the current signal is transduced into a voltage signal in proportion to its magnitude. For example, a current signal of 4 mA is transduced into a voltage signal of 0V and a current signal of 20 mA is transduced into a voltage signal of 10V.

Figure 3:
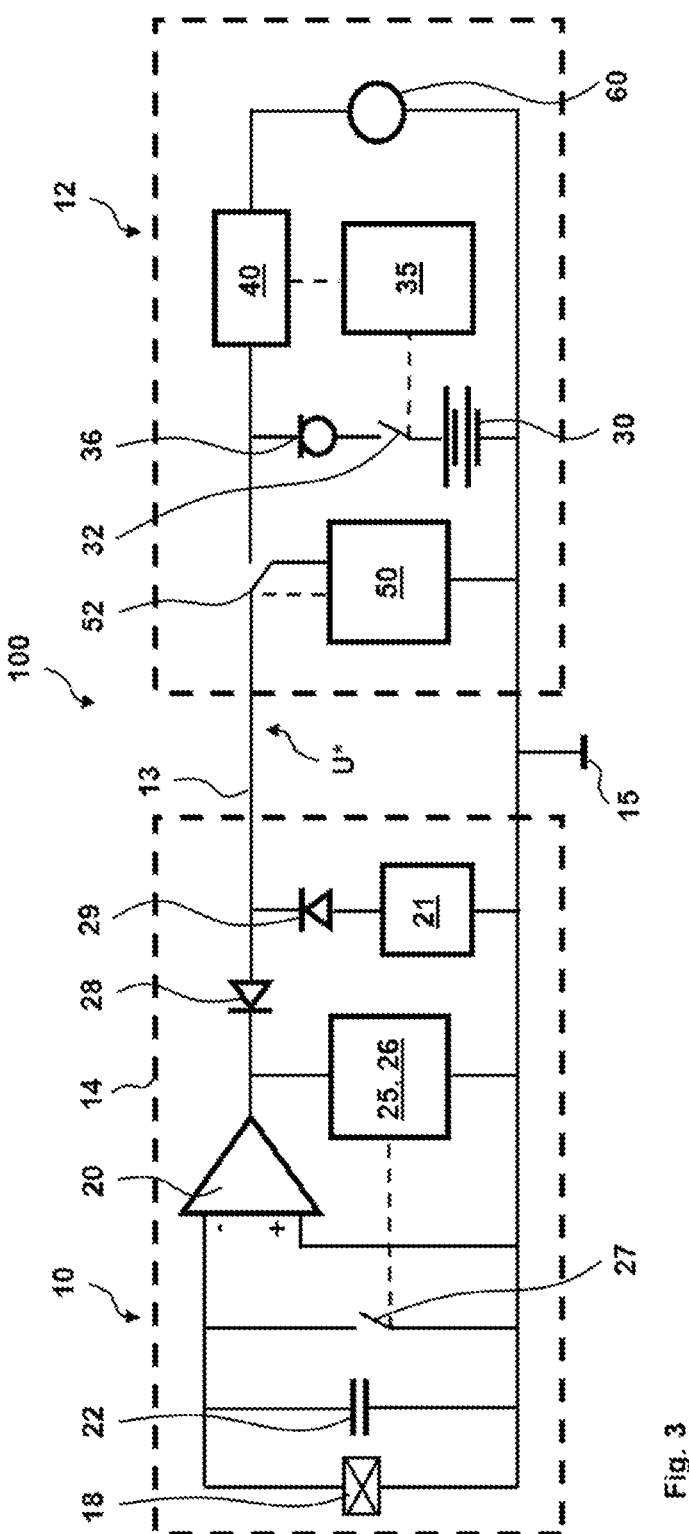
FIG. 3 shows a third embodiment of a piezoelectric measuring device 100 for measuring a cavity pressure prevailing in an injection mold.
Figure 4:
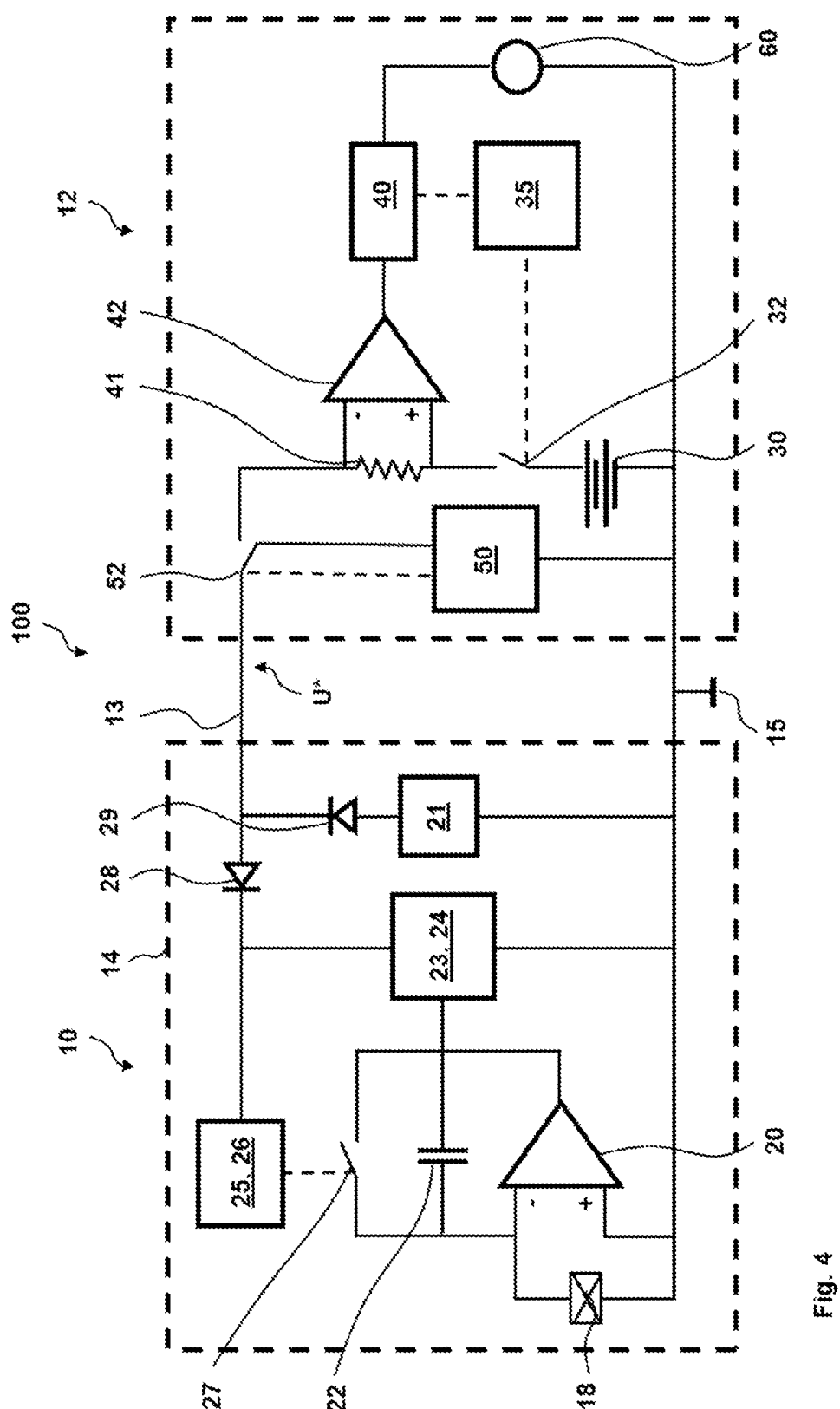
FIG. 4 shows a fourth embodiment of a piezoelectric measuring device 100 for measuring a cavity pressure prevailing in an injection mold.

The two further embodiments of a piezoelectric measuring device 100 shown in FIGS. 3 and 4 also essentially correspond to the first two embodiments of the piezoelectric measuring device 100 according to FIGS. 1 and 2, so that reference is made to their description. In the following, only differences of the two further embodiments of the piezoelectric measuring device 100 according to FIGS. 3 and 4 compared to the first two embodiments of the piezoelectric measuring device 100 according to FIGS. 1 and 2 are explained.

Thus, the sensor element 10 additionally comprises a Transducer Electronic Data Sheet (TEDS), which schematically is designated by the reference numeral 21. The TEDS 21 is a data storage element in which digital data D on the sensor element 10 and/or the measuring point are/is stored. The digital data D on the sensor element 10 comprise the sensor type, sensitivity, calibration data, etc. The TEDS 21 comprises an input and an output. Said TEDS 21 is electrically connected with the input to the conductor element 13, said TEDS 21 is electrically connected with the output to the electrical mass 15.

Additionally, the data acquisition device 12 comprises a read and write circuit 50 and a read and write switching element 52. The read and write circuit 50 is electrically configured and disposed to read digital data D from the TEDS 21 and/or write digital data D into the TEDS 21 in a read-write operation. For this purpose, the read and write switching element 52 can be activated and deactivated by the read and write circuit 50 via the command input shown as a dashed line in FIGS. 3 and 4. In the activated state according to FIGS. 3 and 4, the read and write circuit 50 is electrically connected to the conductor element 13. In the non-activated state, the power supply source 30 is electrically connected to the conductor element 13. A first diode 28 is arranged between the end of the conductor element 13 and the operational amplifier 20. A second diode 29 is arranged between the input of the TEDS 21 and the conductor element 13.

During a measuring cycle, the electrical supply voltage U provided by the voltage supply source 30 is present as a positive DC voltage on the conductor element 13 and the first diode 28 is conductive and the second diode 29 is non-conductive. The second diode 29 then does not allow electrical current to flow from the conductor element 13 into the TEDS 21. During a measuring cycle, said TEDS 21 is thus electrically isolated from the operational amplifier 20 and the data acquisition device 12 and cannot influence the measuring cycle.

The read-write operation is optional. In the flowchart according to FIG. 5, the read-write operation takes place in a zeroth step S0. The zeroth step S0 can occur prior to the other steps S1 to S5 of the method V. To start the read-write operation, the read-write switching element 52 is activated by the read-write circuit 50. Now, a negative DC voltage U*provided by the read and write circuit 50 is applied to the conductive element 13, rendering the first diode 28 non-conductive and the second diode 29 conductive. The first diode 28 then does not allow electric current to flow from the conductive element 13 to the operational amplifier 20. Thus, during a read-write operation, the operational amplifier 20 is electrically isolated from the data acquisition device 12 and cannot affect the read-write operation. Now, said read-write circuit 50 can read digital data D from the TEDS 21 and/or write digital data D into the TEDS 21. To terminate the read-write operation, the read and write switching element 52 is deactivated by the read and write circuit 50.

The four embodiments of a piezoelectric measuring device 100 described thus far may be modified or altered in a variety of ways without departing from the spirit of the invention.

LIST OF REFERENCE NUMERALS

10 sensor element
12 data acquisition device
13 conductor element
14 housing
15 electrical mass
18 piezo element
20 operational amplifier
21 TEDS
22 feedback capacitance
23 current interface
24 4 . . . 20 mA transmitter
25 power-on reset circuit
26 reset logic
27 reset switching element
28 first diode
29 second diode
30 voltage supply source
32 voltage supply switching element
35 measuring cycle circuit
36 constant current regulating diode
40 tare circuit
41 shunt element
42 further operational amplifier
50 read and write circuit
52 read and write switching element
60 electrical voltage signal
100 piezoelectric measuring device
D digital data
M measurement signal
U electrical supply voltage
U* negative DC voltage
V method
S0 zeroth step
S1 first step
S2 second step
S3 third step
S4 fourth step
S5 fifth step

What is claimed is:

1. A piezoelectric measuring device, comprising:
a sensor element configured to generate and transmit a measurement signal for a pressure to be measured and including an operational amplifier, which includes an inverting input and an output;
a data acquisition device configured to acquire and evaluate a transmitted measurement signal, wherein the data acquisition device comprises a tare circuit which is configured and disposed to tare a first measurement signal transmitted from the sensor element to the data acquisition device;
a conductor element configured and disposed for transmitting the measurement signal between the sensor element and the data acquisition device;
wherein the sensor element includes a feedback capacitance that is arranged electrically in parallel with the inverting input and the output of the operational amplifier;

wherein the sensor element includes a reset switching element arranged electrically in parallel with the inverting input and the output of the operational amplifier; and
wherein the data acquisition device is additionally configured to provide an electrical supply voltage for the sensor element and includes a measuring cycle circuit and a power-on reset logic;
wherein the measuring cycle circuit is configured to switch on the electrical supply voltage for the sensor element prior to the start of a measuring cycle and to switch off the electrical supply voltage after completion of the measuring cycle;
and wherein the power-on reset logic is configured to detect the presence of the electrical supply voltage and, wherein the power-on reset logic is configured to close the reset switching element if the electrical supply voltage is present prior to the start of a measurement cycle and to reopen the reset switching element if the electrical supply voltage is not detected.

2. The piezoelectric measuring device according to claim 1, further comprising:
a voltage supply source configured and disposed to supply power to the sensor element; and
a voltage supply switching element electrically connected to the voltage supply source and configured to switch on or off the voltage supply source for the sensor element.

3. The piezoelectric measuring device according to claim 1, wherein the power-on reset logic is configured to actuate the reset switching element to discharge the feedback capacitance.

4. The piezoelectric measuring device according to claim 1, wherein the conductor element is a single-core cable that includes a single signal conductor.

5. The piezoelectric measuring device according to claim 1, wherein the sensor element comprises a TEDS that stores digital data concerning the sensor element and/or a measuring point; wherein the data acquisition device comprises a read and write circuit that is configured to read digital data from the TEDS and/or to write digital data into the TEDS.

6. The piezoelectric measuring device according to claim 1, wherein the sensor element comprises a common housing and a piezo element, which piezo element is configured to generate electric charges under the effect of the pressure to be measured, which piezo element is electrically disposed so that electric charges flow into the inverting input of the operational amplifier; and wherein the operational amplifier and the feedback capacitance are arranged together with the piezo element in the common housing of the sensor element.

7. The piezoelectric measuring device according to claim 1, wherein the measuring device is configured to measure a cavity pressure prevailing in an injection mold during operation.

8. The piezoelectric measuring device according to claim 1, wherein the sensor element comprises a 4 . . . 20 mA transmitter and a current interface; wherein the 4 . . . 20 mA transmitter is connected to the output of the operational amplifier and configured to transduce the measurement signal provided by the operational amplifier as a voltage signal into a current signal; wherein the 4 . . . 20 mA transmitter is connected to the current interface; wherein the current interface is connected to the conductor element; and wherein the current signal can be transmitted to the data acquisition device via the current interface and the conductor element.

9. The piezoelectric measuring device according to claim 8, wherein the data acquisition device comprises a shunt element connected electrically downstream of the voltage supply source; and wherein the data acquisition device includes a further operational amplifier; and wherein the shunt element and the further operational amplifier are configured to transduce a transmitted current signal back into a voltage signal.

10. A piezoelectric measuring device, comprising:

a sensor element configured to generate and transmit a measurement signal for a pressure to be measured and including an operational amplifier, which includes an inverting input and an output;

a data acquisition device configured to acquire and evaluate a transmitted measurement signal;

a conductor element configured and disposed for transmitting the measurement signal between the sensor element and the data acquisition device;

wherein the sensor element includes a feedback capacitance that is arranged electrically in parallel with the inverting input and the output of the operational amplifier;

wherein the sensor element includes a reset switching element arranged electrically in parallel with the inverting input and the output of the operational amplifier;

wherein the data acquisition device is additionally configured to provide an electrical supply voltage for the sensor element and includes a measuring cycle circuit and a power-on reset logic;

wherein the measuring cycle circuit is configured to switch on the electrical supply voltage for the sensor element prior to the start of a measuring cycle and to switch off the electrical supply voltage after completion of the measuring cycle;

and wherein the power-on reset logic is configured to detect the presence of the electrical supply voltage and, wherein the power-on reset logic is configured to close the reset switching element if the electrical supply voltage is present prior to the start of a measurement cycle and to reopen the reset switching element if the electrical supply voltage is not detected;

wherein the power-on reset logic is configured to actuate the reset switching element to discharge the feedback capacitance; and wherein the reset switching element comprises a power-on reset logic that is configured and disposed to close the reset switching element for discharging the feedback capacitance after a predetermined voltage value has been exceeded for a defined time and open the reset switching element when the predetermined voltage value no longer is exceeded for the defined time.

11. A method for operating a piezoelectric measuring device during a measurement cycle according to the following steps:

generating from a sensor element, a measurement signal indicative of a pressure to be measured;

transmitting the measurement signal by means of a conductor element to a data acquisition device that detects and evaluates the transmitted measurement signal;

wherein the data acquisition device comprises a tare circuit that tares a first measurement signal transmitted from the sensor element to the data acquisition device;

wherein the sensor element comprises an operational amplifier having an inverting input and an output;

wherein the sensor element comprises a feedback capacitance electrically arranged in parallel with the inverting input and the output of the operational amplifier;

wherein the sensor element comprises a reset switching element arranged in parallel with the inverting input and the output of the operational amplifier;

wherein the data acquisition device additionally provides an electrical supply voltage for the sensor element and comprises a measurement cycle circuit;

switching on the electrical supply voltage for the sensor element prior to the start of the measurement cycle;

wherein the sensor element comprises a power-on reset logic;

wherein the power-on reset logic detects the presence of the electrical supply voltage and, if the electrical supply voltage is present, then the power-on reset logic closes and reopens the reset switching element prior to the start of the measurement cycle; and the measuring cycle circuit switches off the electrical supply voltage for the sensor element after completion of the measurement cycle.

12. The method according to claim 11, wherein during a measuring cycle for measuring the cavity pressure, an electrical supply voltage for the sensor element is provided by the measurement cycle circuit;

the presence of the electrical supply voltage is detected by means of a reset logic in the power-on reset logic, whereupon the power-on reset logic closes the reset switching element for a predetermined time period, by means of which closed reset switching element the feedback capacitance is discharged, wherein the power-on reset logic subsequently opens the reset switching element again;

wherein the measuring cycle for measuring the cavity pressure is carried out for a specific period of time, during which electrical charges generated by the piezoelectric measuring device are transduced by means of the operational amplifier into the measurement signal;

detecting and evaluating the measurement signal by means of the data acquisition device; and wherein after completion of the measuring cycle, the measuring cycle circuit switches off the electrical supply voltage for the sensor element.

13. The method according to claim 11, wherein the sensor element comprises a first diode, a second diode and a TEDS that stores digital data concerning the sensor element and/or the measuring point;

wherein the data acquisition device comprises a read and write circuit and a read and write switching element;

wherein in order to start a read and write operation, the read and write switching element is activated by the read and write circuit;

a negative DC voltage is provided by the read and write circuit and applied to the conductor element and renders the first diode non-conductive and the second diode conductive;

wherein the read and write circuit is configured to read digital data from the TEDS and/or to write digital data into the TEDS; and in order to terminate the read-write operation, the read and write switching element is deactivated by the read and write circuit.

14. A method for operating a piezoelectric measuring device according to the following steps:

generating from a sensor element, a measurement signal indicative of a pressure to be measured;

transmitting the measurement signal by means of a conductor element to a data acquisition device that detects and evaluates the transmitted measurement signal;

wherein the sensor element comprises an operational amplifier having an inverting input and an output;

wherein the sensor element comprises a feedback capacitance electrically arranged in parallel with the inverting input and the output of the operational amplifier;

wherein the sensor element comprises a reset switching element arranged in parallel with the inverting input and the output of the operational amplifier;

wherein the data acquisition device additionally provides an electrical supply voltage for the sensor element and comprises a measurement cycle circuit;

switching on the electrical supply voltage for the sensor element prior to the start of a measurement cycle;

wherein the sensor element comprises a power-on reset logic;

wherein the power-on reset logic detects the presence of the electrical supply voltage and, if the electrical supply voltage is present, then the power-on reset logic closes and reopens the reset switching element prior to the start of a measurement cycle;

wherein the measuring cycle circuit switches off the electrical supply voltage for the sensor element after completion of the measuring cycle;

wherein the power-on reset logic actuates the reset switching element to discharge the feedback capacitance; and wherein the reset switching element comprises a power-on reset logic that closes the reset switching element for discharging the feedback capacitance after a predetermined voltage value has been exceeded for a defined time and opens the reset switching element when the predetermined voltage value no longer is exceeded for the defined time.

* * * * *